US012479087B2

(12) United States Patent
Takagi et al.

(10) Patent No.: US 12,479,087 B2
(45) Date of Patent: Nov. 25, 2025

(54) ROBOT, CONTROL METHOD OF ROBOT, ARTICLE MANUFACTURING METHOD USING ROBOT, AND RECORDING MEDIUM STORING CONTROL PROGRAM

(71) Applicant: CANON KABUSHIKI KAISHA, Tokyo (JP)

(72) Inventors: Michinao Takagi, Kanagawa (JP); Shuuichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,707

(22) Filed: Nov. 11, 2022

(65) Prior Publication Data

US 2023/0150119 A1    May 18, 2023

(30) Foreign Application Priority Data

Nov. 16, 2021   (JP) .................................. 2021-186421

(51) Int. Cl.
  *B25J 9/12*   (2006.01)
  *B25J 9/00*   (2006.01)
  *B25J 9/06*   (2006.01)

(52) U.S. Cl.
  CPC ............... *B25J 9/06* (2013.01); *B25J 9/0009* (2013.01); *B25J 9/12* (2013.01)

(58) Field of Classification Search
  CPC .................................... B25J 9/126; B25J 9/12
  See application file for complete search history.

(56) References Cited

U.S. PATENT DOCUMENTS

| 2020/0101627 A1* | 4/2020 | Yamazaki | .................. B25J 9/12 |
| 2021/0268644 A1* | 9/2021 | Takagi | ....................... B25J 9/06 |

FOREIGN PATENT DOCUMENTS

| JP | 2003023789 A | 1/2003 |
| JP | 2003136454 A | 5/2003 |
| JP | 2005066742 A | 3/2005 |
| JP | 2011167802 A | 9/2011 |
| JP | 2012206240 A | 10/2012 |
| JP | 2018051708 A | 4/2018 |
| JP | 2018094656 A | 6/2018 |
| JP | 2019063935 A | 4/2019 |
| JP | 2019191674 A | 10/2019 |
| JP | 2020026000 A | 2/2020 |

OTHER PUBLICATIONS

"PCB Trace Width Calculator" Millennium Circuits Limited, available at https://www. mclpcb.com/blog/pcb-trace-width-vs-current-table/ (Year: 2021).*
Wayback Machine screenshot. (Year: 2021).*
Naoto Kawauchi et al., The Simple Body Cabled Robot System, Proceedings of the 19th Annual Conference of the Robotics Society of Japan, 2001, pp. 79-80.

* cited by examiner

*Primary Examiner* — Randell J Krug
(74) *Attorney, Agent, or Firm* — Canon U.S.A., Inc. IP Division

(57) ABSTRACT

A robot includes at least two joints having a first joint and a second joint. The first joint is provided with a first drive source, and the second joint is provided with a second drive source. A motor drive substrate for driving the first drive source and a motor drive substrate for driving the second drive source are differentiated in size.

28 Claims, 9 Drawing Sheets

ROBOT, CONTROL METHOD OF ROBOT, ARTICLE MANUFACTURING METHOD USING ROBOT, AND RECORDING MEDIUM STORING CONTROL PROGRAM

BACKGROUND

Field

The present disclosure relates to a robot.

Description of the Related Art

In recent years, a robot including a plurality of links operating with a plurality of joints has attracted much attention. The robot manipulates parts by an end effector arranged on a leading end of the robot by moving a plurality of links to introduce the parts in a manufacturing plant. In this way, the manufacturing plant is automated. A drive source such as a motor for driving the link is disposed at each joint portion. In the technique discussed in Japanese Patent Application Laid-open No. 2003-136454, a distributed control method type robot system, in which control substrates for controlling a plurality of drive sources and drive substrates for supplying power to the drive sources are respectively disposed on the corresponding joints, is described. By using the distributed control method, the concentration of load on one control apparatus is reduced, and the controllability is improved.

SUMMARY

According to an aspect of the present disclosure, a robot includes at least two joints, wherein the at least two joints include a first joint and a second joint, wherein the first joint is provided with a first drive source, and the second joint is provided with a second drive source, and wherein a motor drive substrate for driving the first drive source and a motor drive substrate for driving the second drive source are differentiated in size.

Further features of the present disclosure will become apparent from the following description of exemplary embodiments with reference to the attached drawings.

DESCRIPTION OF THE EMBODIMENTS

In a commonly used robot, an electrical output to a power source for a joint positioned closer to a placement side (arm base side) of the robot tends to be larger, and that of a joint positioned closer to a leading end side (arm end side) of the robot tends to be smaller. That is because the joint on the placement side (arm base side) needs to move a plurality of links collectively while supporting the plurality of links, and in contrast, the joint positioned closer to the leading end side (arm end side) of the robot needs to execute a minute work while reducing the load on the placement side (arm base side). However, in the technique discussed in Japanese Patent Application Laid-open No. 2003-136454, a motor drive substrate common in size is used for each joint, and a substrate changed in size depending on an amount of output for each joint of a robot is not studied. Accordingly, there may be a case where a motor drive substrate larger than necessary for a drive source provided on a joint is arranged, which may lead to increase in size of the robot.

In addressing a size of a robot, the present disclosure is directed to a technique for reducing the possibility of increase in size of a robot.

Exemplary embodiments according to the present disclosure will be described with reference to the attached drawings.

The exemplary embodiments described below are merely examples, and, for example, the structures of detailed portions can be modified and changed without departing from the scope of the disclosure. Numeral values described in the exemplary embodiments are merely example values and not intended to limit the present disclosure. In the drawings, arrows X, Y, and Z indicate a coordinate system for a whole robot system. In general, an XYZ 3-dimensional coordinate system indicates a world coordinate system of a whole installation environment. In addition, for the convenience of control, a local coordinate system may be used as appropriate for a robot hand, a finger portion, or a joint.

Figure 1:
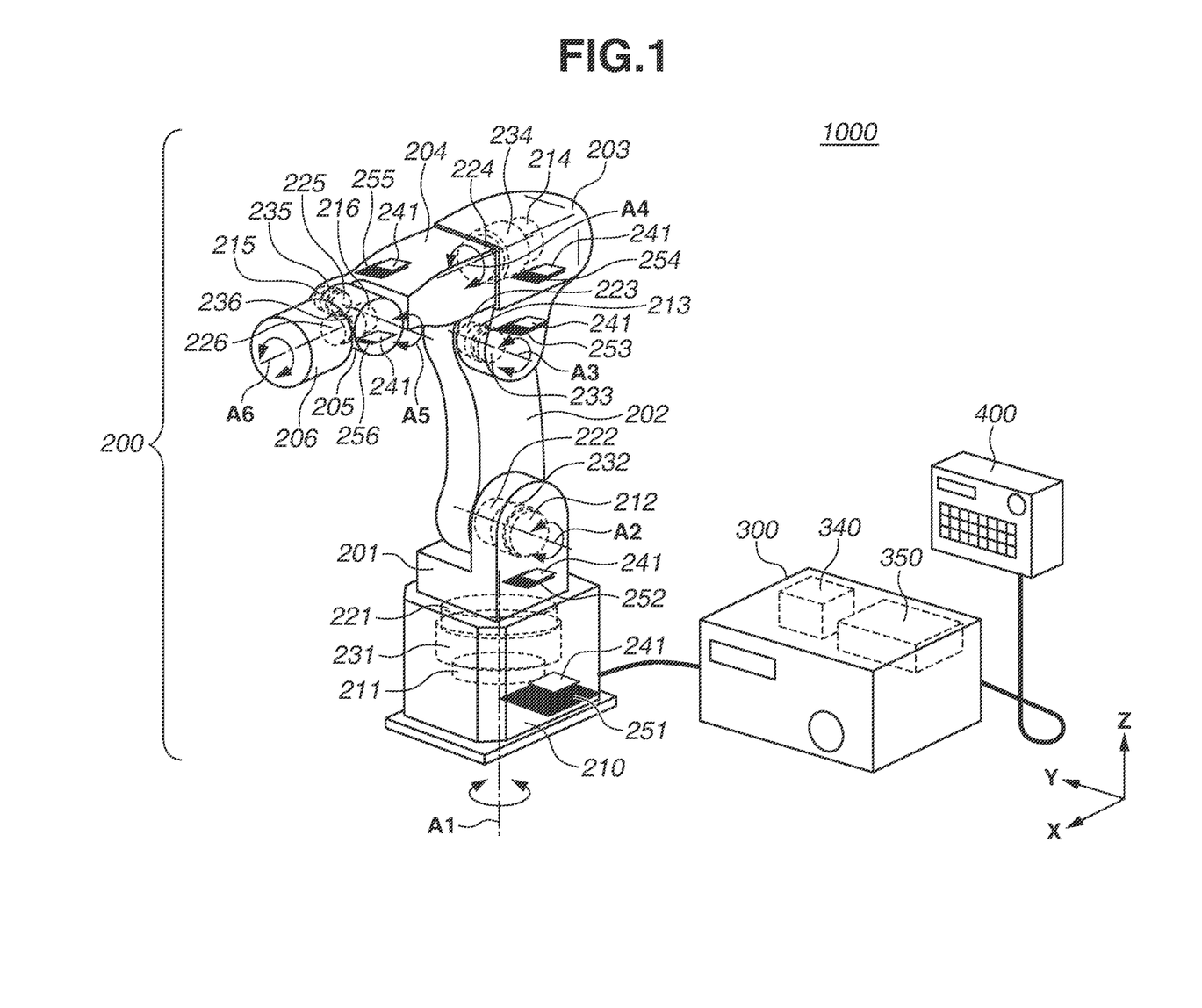
FIG. 1 is a diagram schematically illustrating a robot system according to a first exemplary embodiment.

Now, a first exemplary embodiment will be described. FIG. 1 is a diagram schematically illustrating a robot system 1000 according to the present exemplary embodiment. In FIG. 1, the robot system 1000 includes a robot arm main body 200 configured as a multi-joint robot, a control apparatus 300 for controlling the robot arm main body 200, and an external input apparatus 400. The control apparatus 300 includes a power source apparatus 350 and a robot controller (higher-level control apparatus) 340.

The robot arm main body 200 according to the present exemplary embodiment is configured of a six-axis multi-joints. The robot arm main body 200 includes a base stage 210 and six links 201 to 206. The links 201 to 206 are rotationally driven by six drive devices 231 to 236 for rotationally driving the links 201 to 206 around joint axes A1 to A6 in arrow directions illustrated in FIG. 1, respectively. Each of the drive devices 231 to 236 includes a motor and a speed reduction mechanism for reducing the speed output from the speed reduction mechanism to be lower than the output speed of the motor. In the present exemplary embodiment, a wave-motion gear reduction mechanism is used. In other words, the motors provided on the drive devices 231 to 236 function as drive sources for generating drive powers to relatively move the links 201 to 206 to which the joints are connected, respectively. Encoders 211 to 216 each for detecting a rotational angle of the corresponding motor itself are built in the respective motors.

Torque sensors 221 to 226 for detecting force information are provided between the output ends of the drive devices 231 to 236 and the links 201 to 206 rotating with the output ends of the drive devices 231 to 236, respectively. The torque sensors 221 to 226 each include a structure and an optical encoder for detecting the relative movement amount of the structure. When the joints of the robot arm main body 200 are driven, the relative movement amounts of the structures of the torque sensors 221 to 226 caused by the relative movements of the links of the robot arm main body 200 are detected by the corresponding optical encoders. Further, the robot arm main body 200 includes motor drive substrates 251 to 256 for driving the respective motors of the drive devices 231 to 236 and motor control substrates 241 for controlling the respective motors. The motor control substrates 241 output current commands to the corresponding motors via the motor drive substrates 251 to 256 to control the motors based on input torque command values so that the torques detected by the corresponding torque sensors 221 to 226 for the corresponding joints follow the command values.

In FIG. 1, the link 201 of the robot arm main body 200 is connected to the base stage 210 to be rotatable together with the torque sensor 221 by the drive device 231 with respect to the base stage 210 by using a bearing (not illustrated). It is assumed that the drive device 231 has a movable range from an initial attitude in an arrow direction. The link 202 of the robot arm main body 200 is connected to the link 201 to be rotatable together with the torque sensor 222 by the drive device 232 with respect to the link 201 by using a bearing (not illustrated). It is assumed that the drive device 232 has a movable range from an initial attitude in an arrow direction.

The link 203 of the robot arm main body 200 is connected to the link 202 to be rotatable together with the torque sensor 223 by the drive device 233 with respect to the link 202 by using a bearing (not illustrated). It is assumed that the drive device 233 has a movable range from an initial attitude in an arrow direction. The link 204 of the robot arm main body 200 is connected to the link 203 to be rotatable together with the torque sensor 224 by the drive device 234 with respect to the link 203 by using a bearing (not illustrated). It is assumed that the drive device 234 has a movable range from an initial attitude in an arrow direction.

The link 205 of the robot arm main body 200 is connected to the link 204 to be rotatable together with the torque sensor 225 by the drive device 235 with respect to the link 204 by using a bearing (not illustrated). It is assumed that the drive device 235 has a movable range from an initial attitude in an arrow direction. The link 206 of the robot arm main body 200 is connected to the link 205 to be rotatable together with the torque sensor 226 by the drive device 236 with respect to the link 205 by using a bearing (not illustrated). It is assumed that the drive device 235 has a movable range from an initial attitude in an arrow direction.

It is assumed that an end effector main body such as a hand (electrically driven) or an air hand (pneumatically driven) for performing an assembling work or a conveyance work in a production line is attached to the leading end of the link 206 of the robot arm main body 200. The end effector main body is attached with a fixing or semi-fixing means such as a screw to the link 206 serving as a predetermined portion in the robot arm main body 200. Alternatively, the end effector main body may be attachable using attaching/detaching means (not illustrated) such as a latch (ratchet). Specifically, in a case where the end effector main body is attachable/detachable, the end effector main body arranged at a supply position (not illustrated) may be attached/detached or replaced by the operation of the robot arm main body 200 itself by controlling the robot arm main body 200.

In the present exemplary embodiment, the arm end of the robot arm main body 200 is the link 206 and/or the end effector main body. In a case where the end effector main body grasps an object, the end effector main body and the grasped object (e.g., part or tool) are collectively referred to as the arm end of the robot arm main body 200. More specifically, regardless of whether the end effector main body grasps an object or not, the link 206 and/or the end effector main body are referred to as the arm end.

An operation unit including, for example, operation keys for moving an attitude (position and angle) of each joint of the robot arm main body 200 or moving the arm end of the robot arm main body 200 is arranged on the external input apparatus 400. When an operation is performed on the operation unit of the external input apparatus 400, the control apparatus 300 transmits signals to the drive devices 231 to 236 of the respective joints to control the operation of the robot arm main body 200 in response to the operation of the external input apparatus 400. At this time, each portion of the robot arm main body 200 is controlled by the control apparatus 300 executing a control program described below.

With the configuration described above, the robot arm main body 200 can move the link 206 and/or the end effector main body to a desired position to perform a desired work. For example, an assembled work can be manufactured as a deliverable by performing assembly processing of assembling a predetermined work and another work using the predetermined work and the other work as materials. In this way, the robot arm main body 200 can manufacture articles.

Figure 2:
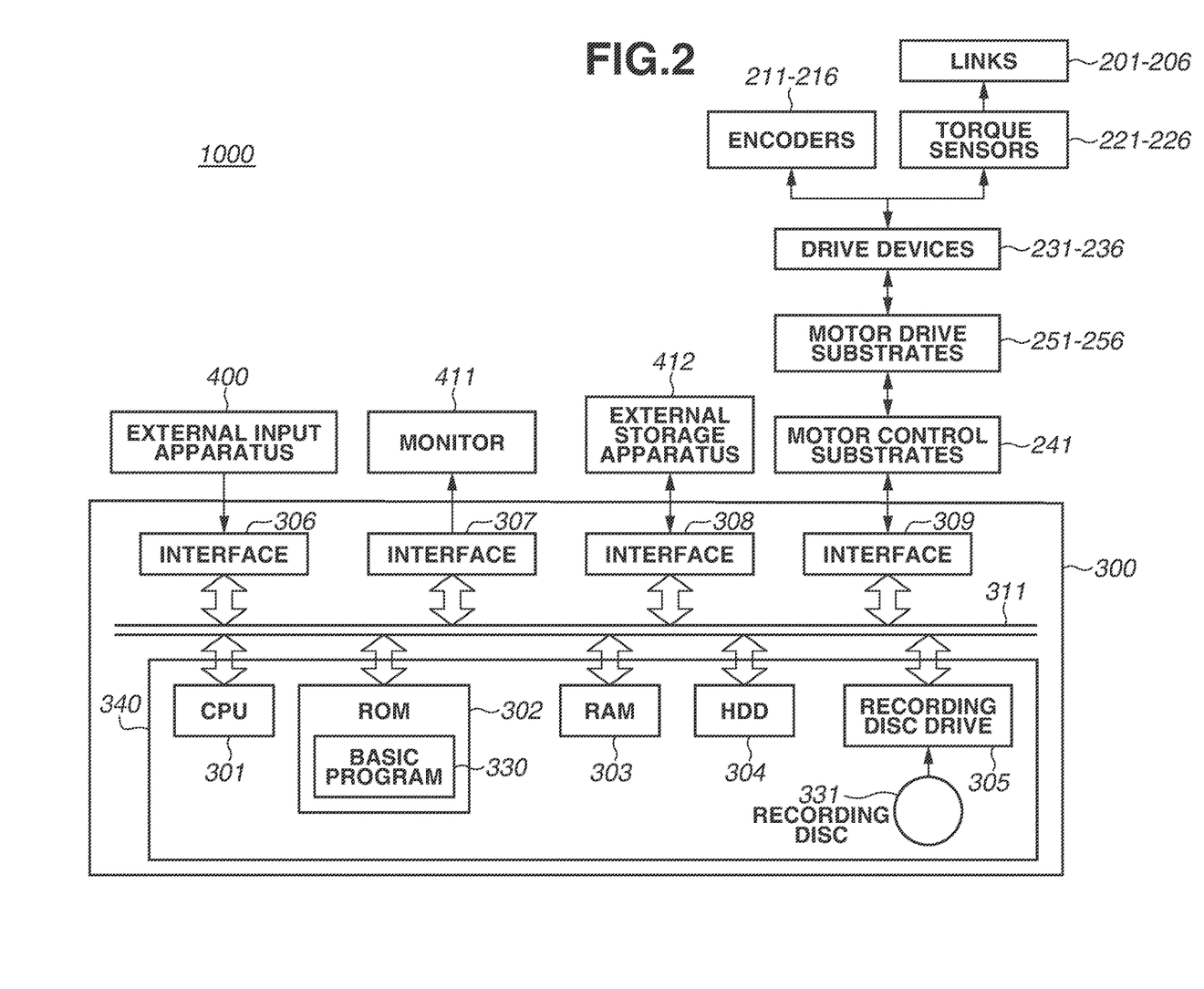
FIG. 2 is a control block diagram of the robot system according to the first exemplary embodiment.

FIG. 2 is a block diagram schematically illustrating a configuration of a control system of the robot system 1000 illustrated in FIG. 1. The control apparatus 300 includes the robot controller 340 configured of a computer, and the robot controller 340 includes a central processing unit (CPU) 301 serving as a processor. The robot controller 340 further includes, as a storage unit, a read-only memory (ROM) 302, a random access memory (RAM) 303, a hard disc drive (HDD) 304, and a recording disc drive 305. The control apparatus 300 includes interfaces 306, 307, 308, and 309 for communicating with corresponding devices. The CPU 301, the ROM 302, the RAM 303, the interfaces 306 to 309 are communicably connected with each other with a bus 311.

Among these devices, the RAM 303 is used for temporarily storing data such as a designated point or a control command issued by operating the external input apparatus 400. A basic program 330 such as a Basic Input/Output System for the CPU 301 to execute various kinds of calculation processing is stored in the ROM 302. The CPU 301 executes the various kinds of calculation processing based on the control program recorded (stored) in the HDD 304. The HDD 304 is a storage unit for storing various kinds of data and the like, which are the calculation processing result of the CPU 301. The recording disc drive 305 can read various kinds of data or a control program stored in a recording disc 331. Further, a monitor 411 for displaying various images and an external storage apparatus 412, such as a rewritable non-volatile memory or an external HDD, are respectively connected to the interfaces 307 and 308.

The external input apparatus 400 may be an operation apparatus such as a teaching pendant (TP), but may also be a computer apparatus (personal computer (PC) or server)

different from the operation apparatus that can edit a robot program. The external input apparatus 400 can connect to the control apparatus 300 through a wired or wireless communication connection means, and includes a user interface function for a robot operation and a status display, and the like. A target joint angle of each joint input from the external input apparatus 400 is output to the CPU 301 via the interface 306 and the bus 311.

The CPU 301 receives, for example, teaching point data input via the external input apparatus 400 from the interface 306. The CPU 301 can generate an orbit of each axis of the robot arm main body 200 based on the teaching point data input from the external input apparatus 400, and transmit the orbit to each of the drive devices 231 to 236 via the interface 309 using the control substrates 241 and the motor drive substrates 251 to 256. The CPU 301 outputs data of a drive command indicating a control amount of a rotation angle of the motor of each of the drive devices 231 to 236 at a predetermined interval to the control substrates 241 via the bus 311 and the interface 309.

The motor control substrates 241 calculate the current output amounts to be supplied to the motors of the drive devices 231 to 236 based on the drive command received from the CPU 301, and supply currents to the motors to perform joint angle controls of the joints by supplying the currents to the motors using the motor drive substrates 251 to 256, respectively. The detection signals output from the respective encoders 211 to 216 and the respective torque sensors 221 to 226 are output to the CPU 301 via the interface 309 and the bus 311. More specifically, the CPU 301 performs feedback control of the motors of the drive devices 231 to 236 via the motor control substrates 241 so that current joint angle values detected by the encoders 211 to 216 become the target joint angles, respectively. Similarly, the CPU 301 performs feedback control of each motor so that a current joint torque value detected by each of the corresponding torque sensors 221 to 226 becomes a target joint torque.

The CPU 301 can control the torque imposed on each of the links 201 to 206 when driven, by returning the output of each of the above-described torque sensors 221 to 226 to the control apparatus 300, and feed-backing the output to the drive of each of the corresponding drive devices 231 to 236. Further, the CPU 301 can obtain forces generated at the links 201 to 206 of the robot arm main body 200 from the values of the torque sensors 221 to 226 by calculation, respectively. In this way, it is possible to perform the feedback control of the load to be imposed on an assembly target part.

When a robot hand main body (not illustrated) is used as the end effector main body, the control apparatus 300 may be connected with a hand motor (not illustrated) via an interface and a hand motor driver. The hand motor driver calculates an output amount of current to be output to the hand motor based on a drive command received from the CPU 301, and supplies the calculated current to the hand motor to control the speed of the hand motor. The pulse signal output from the encoder of the hand motor is output to the CPU 301 via the interface and a bus. In this way, the CPU 301 performs feedback control of the hand motor via the hand motor driver so that the current value of the speed of the hand motor detected by the encoder becomes a target speed.

Figure 3:
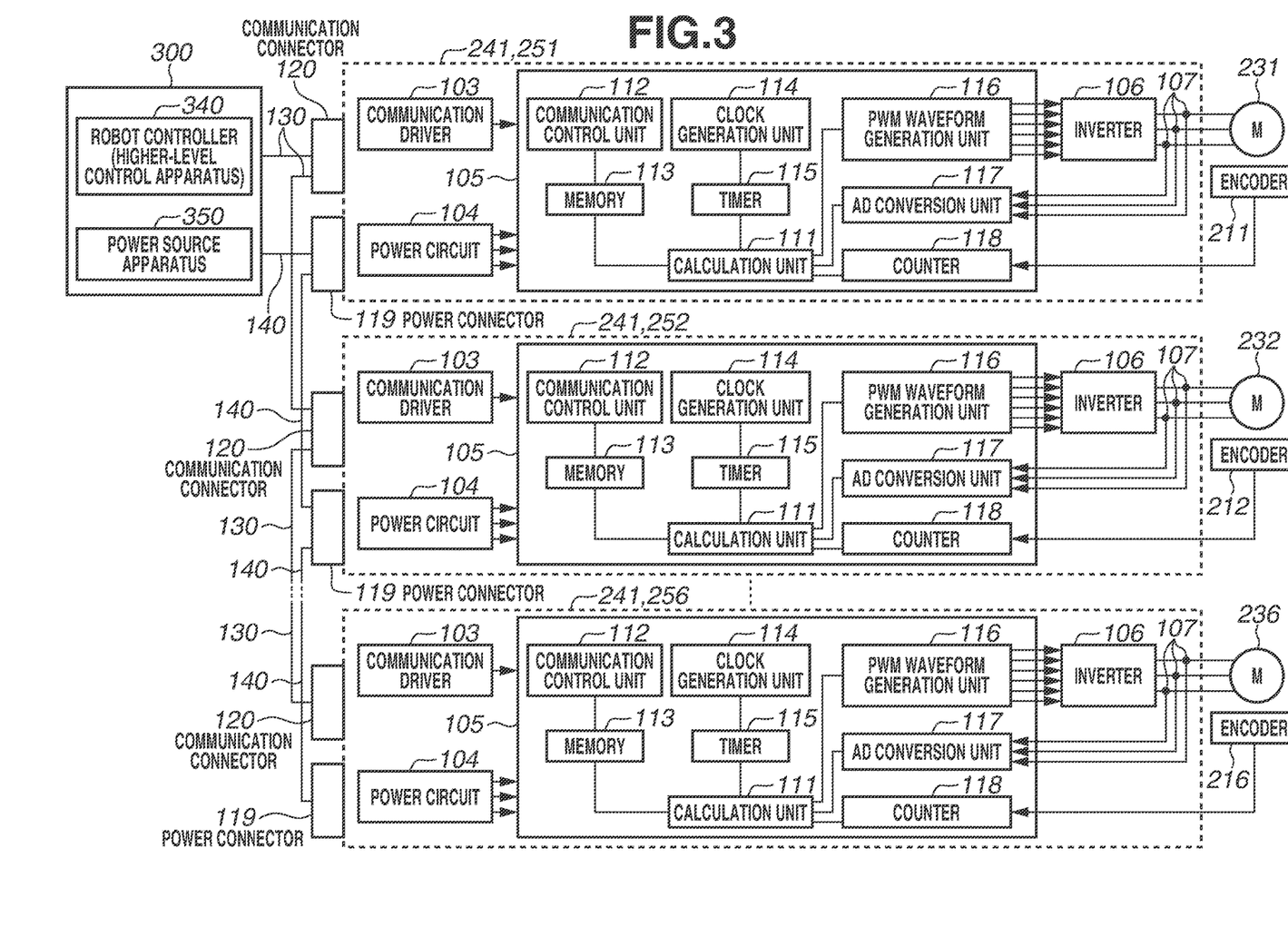
FIG. 3 is a block diagram illustrating details of control blocks of motor control substrates and motor drive substrates.

FIG. 3 is a block diagram illustrating details of control blocks of the motor control substrates 241 and the motor drive substrates 251 to 256 according to the present exemplary embodiment. In FIG. 3, each of the motor control substrates 241 and each of the corresponding motor drive substrates 251 to 256 are collectively indicated as a block, and parts mounted on each of the motor control substrates 241 and parts mounted on each of the motor drive substrates 251 to 256 will be described below with reference to FIGS. 4A, 4B, and 4C. The ratio between the number of the motor control substrates 241 and the number of the motor drive substrates 251 to 256 is "1:1". More specifically, the motor control substrate 241 having a same specification is used for each joint, and the specifications of the motor drive substrates 251 to 256 are differentiated depending on electrical outputs of the motors of respective joints. Each of the motor control substrates 241 is mounted with a communication driver 103 and a control circuit 105. Each of the motor drive substrates 251 to 256 is mounted with a power circuit 104, an inverter 106, a power connector (or interface (IF)) 119, and a communication connector (or IF) 120. The motor drive substrates 251 to 256 and the motor control substrates 241 are electrically connected using, for example, inter-substrate connectors, cables, or flexible flat cables.

The robot controller 340 is connected with the motor control substrates 241 via serial communication cables 130 in a daisy chain connection manner. The robot controller 340 performs distributed control to control the motor of each of the drive devices 231 to 236 by transmitting a command to each of the corresponding motor control substrates 241. The robot controller 340 calculates an orbit of the robot arm main body 200 in order to implement the operation instructed from the external input apparatus 400. The robot controller 340 transmits to each of the motor control substrates 241 various kinds of commands such as an operation command (specifically, position command) for instructing the motor operation of each rotary motor based on the result of the orbit calculation, an operation execution start command for instructing the execution of the operation based on the operation command, and a synchronization command.

The power source apparatus 350 supplies power to the motor control substrates 241 and the motor drive substrates 251 to 256 (motor drive substrates 253 to 255 are not illustrated to simplify the drawing) via a power cable(s) 140. The motor drive substrates 251 to 256 with the power supplied thereto supply power to the motors of the drive devices 231 to 236 based on the instructions from the motor control substrates 241 to drive the motors, respectively.

The motor control substrates 241 and the motor drive substrates 251 to 256 are connected to the robot controller 340 via the serial communication cable(s) 130 serving as a communication line(s) and the communication connector(s) 120. Each of the communication connectors 120 functions as a communication IF. Various commands are transmitted to each of the motor control substrates 241 as a signal by a serial communication using a communication protocol such as controller area network (CAN) via the serial communication cable(s) 130. Transmission and reception of the status notification or the like is performed between the robot controller 340 and the motor control substrates 241 via the serial communication cable(s) 130.

Each of the motor control substrates 241 includes a communication driver 103 for receiving the signals indicating the various kinds of commands from the robot controller 340, and each of the motor drive substrates 251 to 256 includes the power circuit 104 for converting the voltage supplied from the power source apparatus 350 to a predetermined direct current (DC) voltage. Circuits may include one or more circuits. Each of the power circuits 104 is connected with the power source apparatus 350 via the power cable(s) 140 and the power connector(s) 119. Each of the power connectors 119 functions as a power source IF.

The control circuit 105 of each of the motor control substrates 241 is configured of a microcomputer and includes a plurality of switching elements. Each of the control circuits 105 includes a calculation unit 111, a communication control unit 112, a memory 113, a clock generation unit 114, a timer 115, a pulse width modulation (PWM) waveform generation unit 116, an analog to digital (AD) conversion unit 117, and a counter 118. In the present exemplary embodiment, each of the motors is driven by the PWM waveform generation unit 116 and the inverter 106.

Hereinbelow, for the simplification of descriptions, descriptions are mainly given of the units relating to the motor drive substrate 251 and the corresponding motor control substrate 241 because all the units with the same numerals assigned in the motor drive substrates 252 to 256 have similar configurations and functions. The motor drive substrate 251 includes a current detection unit 107 for detecting the current flowing through the motor (more specifically, winding wire of the motor) of the drive device 231 from the inverter 106. The current detection unit 107 outputs a current value indicating a current detection result as a voltage. In other words, the current detection unit 107 outputs the voltage of the voltage value proportional to or corresponding to the current value.

The counter 118 obtains a detection result of the encoder 211 for detecting the rotational position of the motor of the drive device 231, i.e., the rotational position of the rotor of the motor (in other words, rotational angle). The encoder 211 may be, for example, a rotary encoder to output pulses due to the rotations of the rotor. The counter 118 counts the number of pulses output from the encoder 211. The counter 118 outputs the count result to the calculation unit 111 as motor rotation positional information (hereinbelow, just refers to as positional information). In this way, the rotational position of the motor is detected by the counter 118 counting the pulses output from the encoder 211. Although it is not illustrated in FIG. 3, for the simplification of the description, it is assumed that a counter for obtaining the detection result of the torque sensor 221 is also separately provided.

The communication control unit 112 controls data of various kinds of commands received from the communication driver 103 to be stored in the memory 113. The memory 113 is a storage unit such as a RAM, and stores the received data of the various kinds of commands under the control of the communication control unit 112. The clock generation unit 114 is, for example, a crystal oscillator, and generates a clock signal based on a unique oscillation frequency of the crystal oscillator and outputs the clock signal. The timer 115 measures time based on the clock signal generated by the clock generation unit 114, and outputs the result of the measured time to the calculation unit 111.

The calculation unit 111 is, for example, a CPU, and performs calculation processing according to a program stored in a nonvolatile memory (not illustrated), based on the various commands output from the robot controller 340, current information indicating the current detection result, and the positional information indicating the position detection result. The calculation unit 111 calculates the drive command to be output to the PWM waveform generation unit 116 as one piece of the calculation processing. The calculation unit 111 outputs the drive command to the PWM waveform generation unit 116 when the calculation of the drive command is ended.

The PWM waveform generation unit 116 generates a PWM signal to be output to the gate terminal (base terminal) of each switching element of the inverter 106 in response to the input of the drive command from the calculation unit 111. The inverter 106 performs a pulse-width modulation on the supplied DC voltage by the switching operation of the switching element by the PWM signal, and outputs it to the motor of the drive device 231. In this way, alternating current (AC), for example, three-phase AC current is output to the motor of the drive device 231. Through the operations of the PWM waveform generation unit 116 and the inverter 106, the motor of the drive device 231 is driven according to the input drive command. In other words, the PWM waveform generation unit 116 and the inverter 106 supply current to the motor of the drive device 231 according to the input drive command.

The AD conversion unit 117 converts an output voltage (analog signal) indicating the current value output from the current detection unit 107 into a digital signal recognizable by the calculation unit 111, and outputs the current information converted into the digital signal to the calculation unit 111. The calculation unit 111 monitors the action of the robot arm main body 200, i.e., the rotational position of the motor of the drive device 231 and the current, performs feedback control based on the command received from the robot controller 340, and controls the drive of the motor of the drive device 231. More specifically, the calculation unit 111 performs calculation processing of the drive command for controlling the position, speed, and current (torque) of the motor through position control processing, speed control processing, and current control processing, based on the current information obtained from the current detection unit 107 and the positional information obtained from the encoder 211.

Figure 4A:
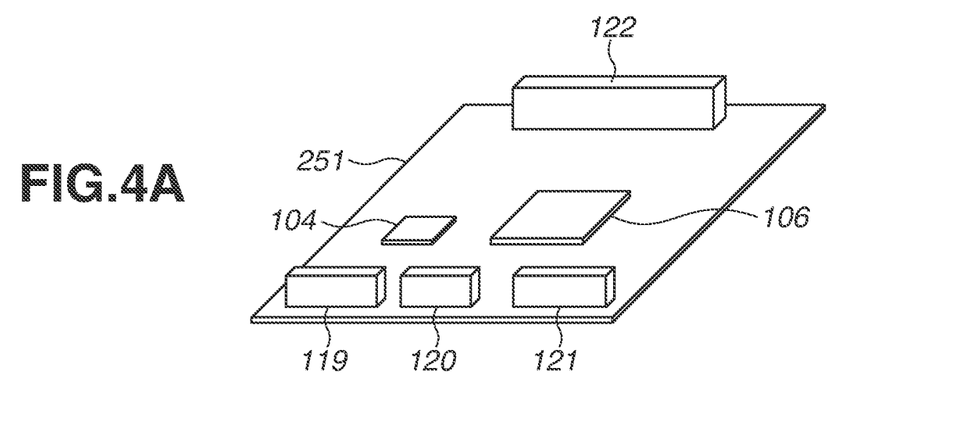
FIGS. 4A, 4B, and 4C are diagrams illustrating substrate configurations of a motor control substrate and a motor drive substrate according to the first exemplary embodiment.
Figure 4B:
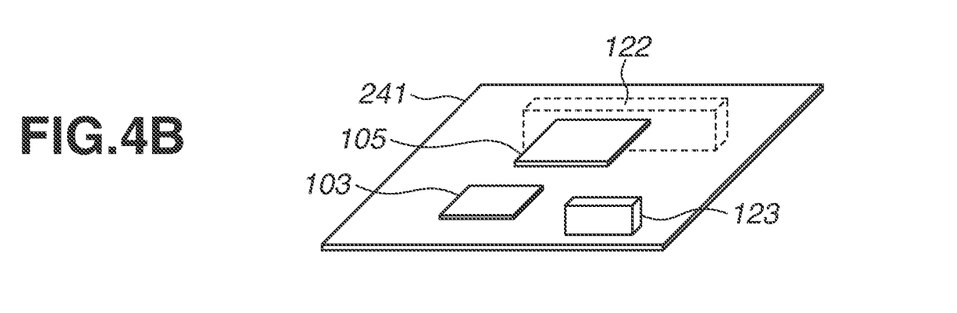
Figure 4C:
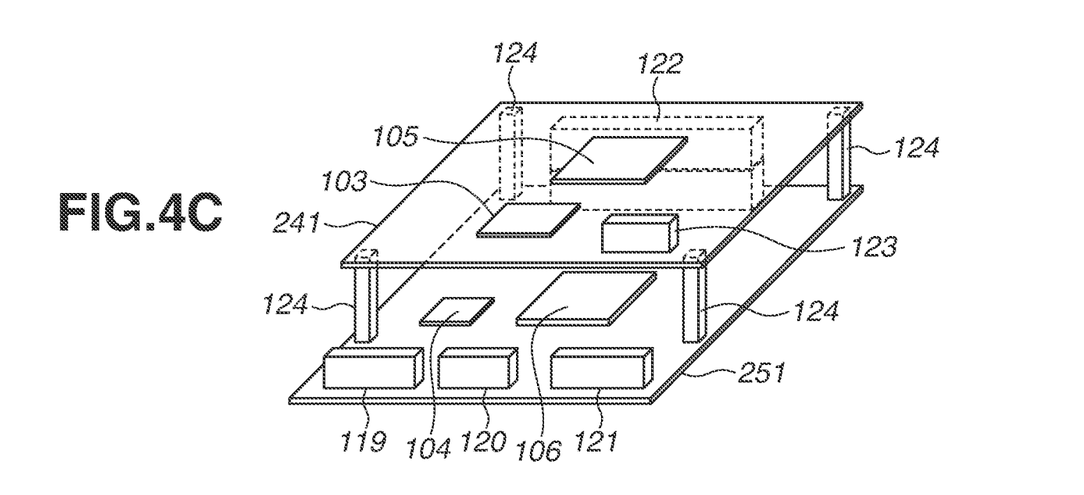

FIGS. 4A, 4B, and 4C are diagrams illustrating substrate configurations of the motor control substrates 241 and the motor drive substrates 251 to 256. For the simplification of description, FIGS. 4A, 4B, and 4C illustrate the motor drive substrate 251 as an example. As will be described below, the motor drive substrates 252 to 256 other than the motor drive substrate 251 are also connected to the motor control substrates 241, respectively. FIG. 4A is a perspective view of the motor drive substrate 251. FIG. 4B is a perspective view of the motor control substrate 241. FIG. 4C is a perspective view of a case where the motor drive substrate 251 and the motor control substrate 241 are combined by placing one above the other to be a pair.

As illustrated in FIG. 4A, the motor drive substrate 251 includes the inverter 106, the power circuit 104, the power connector 119, the communication connector 120, a motor drive power connector 121, and an inter-substrate connector 122. The power connector 119 and the communication connector 120 are electrically connected to the robot controller (higher-level control apparatus) 340, the power source apparatus 350, or the substrates of other joints, via the power cable(s) 140 and the serial communication cable(S) 130. The motor drive power connector 121 is connected to the motor of the drive device 231 via a cable, and supplies motor drive power output from the inverter 106. In FIG. 4A of the present exemplary embodiment, the power connector 119 and the communication connector 120 are separately configured, but may be configured as one connector.

As illustrated in FIG. 4B, the motor control substrate 241 includes the communication driver 103, the control circuit 105 configured of a microcomputer, a position detection connector 123, and the inter-substrate connector 122. In FIG. 4B, the inter-substrate connector 122 is provided on the back side of the motor control substrate 241. The position detection connector 123 is electrically connected to the encoder 211 arranged on the motor of the drive device 231.

In the present exemplary embodiment, the communication connector 120, the power connector 119, the motor drive power connector 121, and the position detection connector 123 may also be referred to as a first connector, a second connector, a third connector, and a fourth connector, respectively.

With reference to FIG. 4C, the motor drive substrate 251 and the motor control substrate 241 are electrically connected via the inter-substrate connectors 122, to supply drive power to the electronic components and to perform communications of various commands (control signals) therebetween. Between the motor drive substrate 251 and the motor control substrate 241, metal spacers (supporting posts) 124 are disposed at four corners thereof. In this way, by increasing the contact area of the ground (GND) between the motor drive substrate 251 and the motor control substrate 241 to reduce the impedance therebetween, it is possible to obtain an effect of strengthening noise immunity. Heat generated in the motor drive substrate 251 when the motor of the drive device 231 is driven can be let out by using the metal spacers 124 with a high thermal conductivity. In this way, the heat dissipation pattern (solid GND pattern) area of the motor drive substrate 251 can be reduced and the motor drive substrate 251 can be downsized.

In FIG. 4C, the motor control substrate 241 is arranged over the motor drive substrate 251 to cover the power circuit 104 and the inverter 106 of the motor drive substrate 251 and to be able to access each connector on the motor drive substrate 251. In this way, it is possible to make it difficult to access the portions with a risk of electrical shock such as the power circuit 104 and the inverter 106 in a case where the user is allowed to access each substrate for maintenance or the like when the motor control substrate 241 and the motor drive substrate 251 are provided on the robot arm main body 200. On the other hand, the user can easily access each connector on the motor drive substrate 251 which the cable is to be pulled out from or the cable is to be put into. In this way, at a time of maintenance, it is possible to secure the convenience at the time of the maintenance while securing the safety of the user.

In FIGS. 4A, 4B, and 4C, the position detection connector 123 is mounted on the motor control substrate 241, but may be mounted on the motor drive substrate 251. The position of the position detection connector 123 can be changed for each joint by mounting the position detection connector 123 on the motor drive substrate 251, and the cable for each joint of the robot arm main body 200 can be designed to have a shortest wiring route and a most appropriate wiring route. In this way, it is possible to downsize the entire robot arm main body 200. Most appropriate electrical components may be mounted on the motor drive substrate 251 depending on the motor specification and the operating current for each joint, or the same electrical components may be mounted on all the joint.

Figure 5:
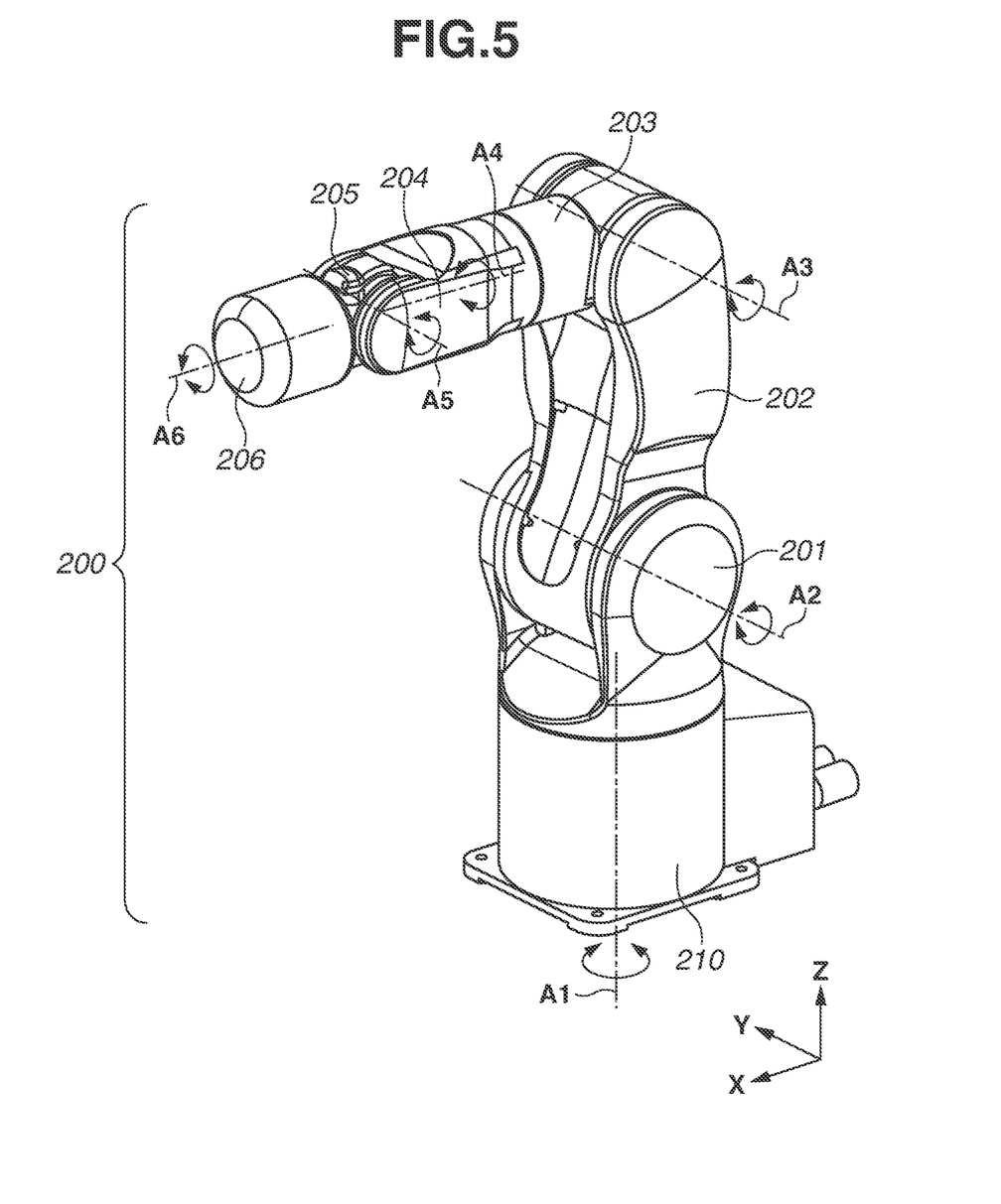
FIG. 5 is a detailed diagram illustrating link shapes of a robot arm main body according to the first exemplary embodiment.

A detailed description will be given of a case where the substrate designs of the motor drive substrates 251 to 256 are differentiated based on the operation currents of the motors disposed on the drive devices 231 to 236 of the robot arm main body 200 and the motor drive substrates 251 to 256 are arranged on the robot arm main body 200. FIG. 5 is a detailed diagram of each link shape of the robot arm main body 200 according to the present exemplary embodiment. With reference to FIG. 5, the link 201 of the robot arm main body 200 rotates with respect to the base stage 210 with an axis A1 as a rotational axis. The link 202 of the robot arm main body 200 rotates with respect to the link 201 with an axis A2 as a rotational axis. The link 203 of the robot arm main body 200 rotates with respect to the link 202 with an axis A3 as a rotational axis. It is assumed that the drive device 233 has a movable range from the initial attitude in an arrow direction. The link 204 of the robot arm main body 200 rotates with respect to the link 203 with an axis A4 as a rotational axis. The link 205 of the robot arm main body 200 rotates with respect to the link 204 with an axis A5 as a rotational axis. The link 206 of the robot arm main body 200 rotates with respect to the link 205 with an axis A6 as a rotational axis.

The other drive devices, the other motor drive substrates, and the other motor control substrates provided in the robot arm main body 200 are similar to those described above. In the present exemplary embodiment, the joint and the motor for making the base stage 210 and the link 201 rotatable may also be referred to as a first joint and a first drive source, respectively. The joint and the motor for making the link 205 and the link 206 rotatable may also be referred to as a second joint and a second drive source, respectively. The joint and the motor for making the link 201 and the link 202 rotatable may also be referred to as a third joint and a third drive source, respectively.

Figure 6A:
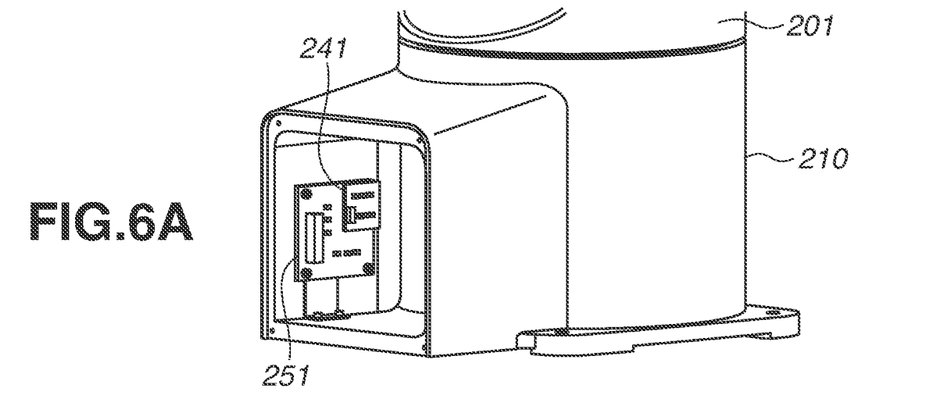
FIGS. 6A, 6B, and 6C are diagrams each illustrating a state where a motor control substrate and a motor drive substrate are arranged at each joint, according to the first exemplary embodiment.
Figure 6B:
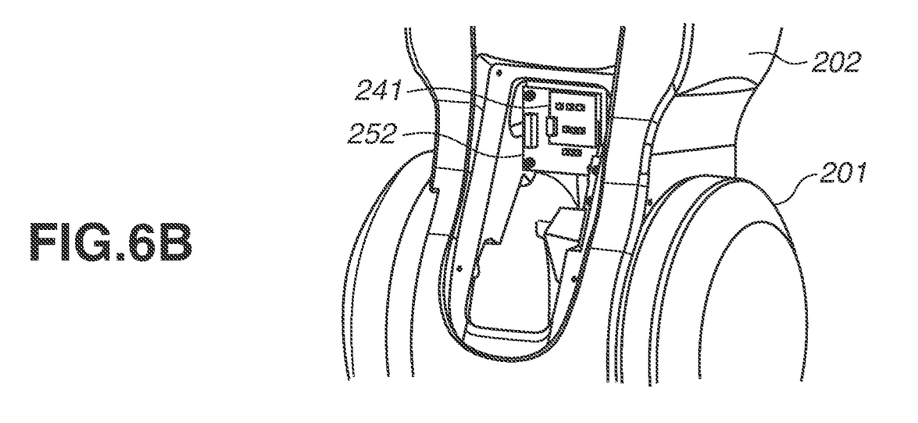
Figure 6C:
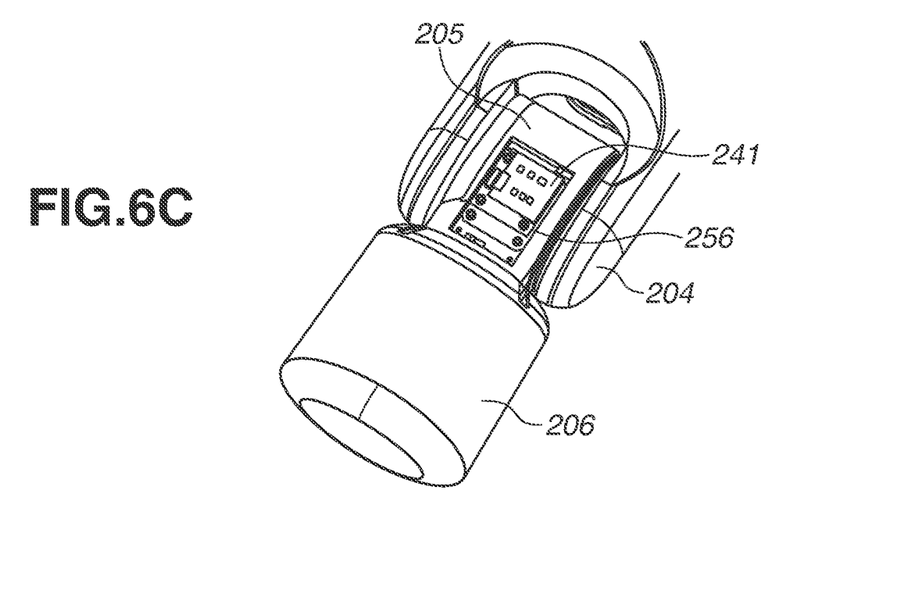

FIGS. 6A, 6B, and 6C are diagrams illustrating cases where the motor control substrates 241 and the motor drive substrates 251, 252, and 256 according to the present exemplary embodiment are arranged. FIG. 6A is a diagram illustrating a case where the motor control substrate 241 and the motor drive substrate 251 are arranged on the base stage 210. FIG. 6B is a diagram illustrating a case where the motor control substrate 241 and the motor drive substrate 252 are arranged on the link 202. FIG. 6C is a diagram illustrating a case where the motor control substrate 241 and the motor drive substrate 256 are arranged on the link 205. For the simplification of descriptions, the motor drive substrates 251, 252, and 256 are described as examples, and it is assumed that the size design similar to that of the motor drive substrate 252 is performed on each of motor drive substrates 253, 254, and 255.

With reference to FIG. 6A, the operation current of the motor drive substrate 251 provided on the base stage 210 is large because the motor drive substrate 251 drives the motor of the drive device 231 that moves the link 201 located on the base side of the robot arm main body 200. For this reason, the motor drive substrate 251 is larger than other motor drive substrates. In FIG. 6B, the motor drive substrate 252 provided on the link 202 drives the motor of the drive device 232 that moves the link 202 located in the middle portion of the robot arm main body 200. Accordingly, the motor drive substrate 252 is a little smaller than the motor drive substrate 251. In FIG. 6C, since the motor drive substrate 256 provided on the link 205 drives the motor of the drive device 236 that moves the link 206 located on the leading end side of the robot arm main body 200, the operation current of the motor drive substrate 256 is small. Accordingly, the motor drive substrate 256 is smallest compared with other motor drive substrates.

According to the present exemplary embodiment, the motor drive substrates 251 to 256 enable the substrate design for the substrate with an appropriate size for each joint depending on the operation current of the motor of each of the drive devices 231 to 236. Since such the motor drive substrate is arranged, taking the effect of noise in consideration, near the motor for moving each joint, the arrangement space becomes small because of the configuration of the robot arm. Thus, the substrate size (substrate area) may be strictly limited. However, as in the present exemplary embodiment, it is possible to reduce the substrate size while overcoming the limit due to the configuration of the robot arm, by enabling the substrate design for the substrate with an appropriate size for each joint depending on the operation current of each motor. In this way, the possibility of increasing the robot size can be reduced.

In the present exemplary embodiment, the motor control substrate for controlling the motor and the motor drive substrate for driving the motor are separately provided. The substrates for each joint in the distributed control type are provided with many electrical components such as a motor drive unit, a control unit for controlling the motor drive unit, a power circuit, and communication interfaces for communicating with substrates for each joint and a robot controller (higher-level control apparatus). Accordingly, the occupied area in the substrate increases. However, as in the present exemplary embodiment, by separating the motor control substrate for controlling the motor and the motor drive substrate for driving the motor, since the substrates can be arranged one above the other as illustrated in FIG. 4C, the occupied area in the substrate can be reduced.

Each of the motor drive substrates 251 to 256 can be optimized individually depending on the specifications of the motors of the drive devices 231 to 236 and the inverters 106 by mounting the power circuits 104 on the motor drive substrates 251 to 256, respectively, and the motor control substrates 241 of all the joints can be commonalized. By commonalizing the motor control substrates 241, a per-unit price of the motor control substrates 241 at a time of manufacturing can be reduced to lower the price of the robot arm main body 200. Further, in a development of a robot arm different in intended use (e.g., work target object or conveyance target object is different in weight, or production speed reduction is required), the common motor control substrate can be used for other robots just by performing a minor change of the motor drive substrate to adjust to the intended use. In this way, the development time period and the development cost can also be reduced.

In general, since the lower the load on the motor is, the lower the operation current becomes, the width of the power source pattern can be designed narrower. Since the heat discharge amount output from the electronic components of the power circuit and the inverter becomes lower, the heat dissipation pattern can be made smaller. Accordingly, since the load of the motor reduces, the area of the motor drive substrate can be made smaller. The noise generated when the motor is operating can be reduced by mounting the inverter on the motor drive substrate 251. Separating the heat source generated due to the operation current from the motor control substrate 241 enables the reduction of noise filters in a signal system and the reduction of the area of the heat dissipation pattern of the motor control substrate 241, to reduce the size of the motor control substrate 241.

In a vertical multi-joint robot such as the robot arm main body 200 according to the present exemplary embodiment, the bending and extending forces in the vertical direction with respect to the arm installed surface of the robot arm main body 200 are larger than the load to rotate in the horizontal direction because the arm is affected by the acceleration of gravity at the time of an arm up operation. Thus, two sizes of the motor drive substrates may be designed for the joint that rotates in the horizontal direction and the joint that bends and extends in the vertical direction. This design can be achieved if the motor drive substrate provided on the joint that bends and extends in the vertical direction is large and the motor drive substrate provided on the joint that rotates in the horizontal direction is small.

The sizes of the individual motor drive substrates may be made gradually smaller toward the arm end, and the sizes of the motor drive substrates may be made different for the respective joints. In this case, the size of the motor drive substrate located at the arm end (leading end) of the robot arm main body 200 is smaller than all other motor drive substrates for other joints. Particularly in a case of horizontal multi-joint robot (scalar robot), since the self-weight (i.e., motor load) of the robot arm reduces toward the arm end, it is more effective to design the areas of the respective motor drive substrates arranged closer to the arm end side to be gradually smaller.

In the present exemplary embodiment, the size of the motor drive substrate is determined with the area as a reference, but it may be determined with a volume, a weight, or a mass as a reference. At least one of the area, the volume, the weight, and the mass of the motor drive substrate may be differentiated depending on the electrical output of the target motor.

Now, a second exemplary embodiment will be described. A hardware configuration and a system configuration different from those of the first exemplary embodiment will be illustrated and described. The components similar to those in the first exemplary embodiment have the similar configurations and functions, and detailed descriptions thereof are omitted.

Figure 7A:
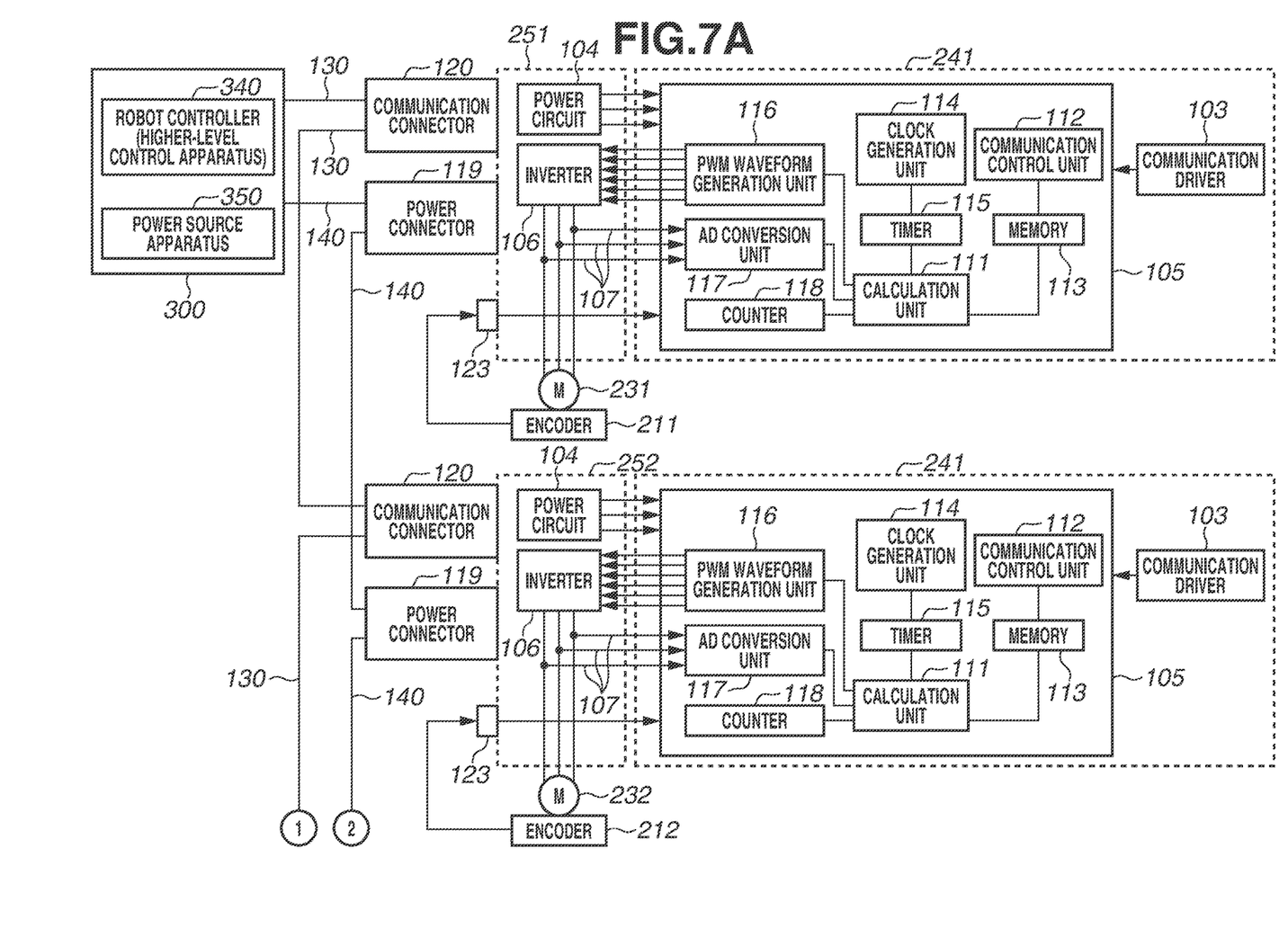
FIGS. 7A and 7B are block diagrams illustrating substrate configurations of motor control substrates and motor drive substrates according to a second exemplary embodiment.
Figure 7B:
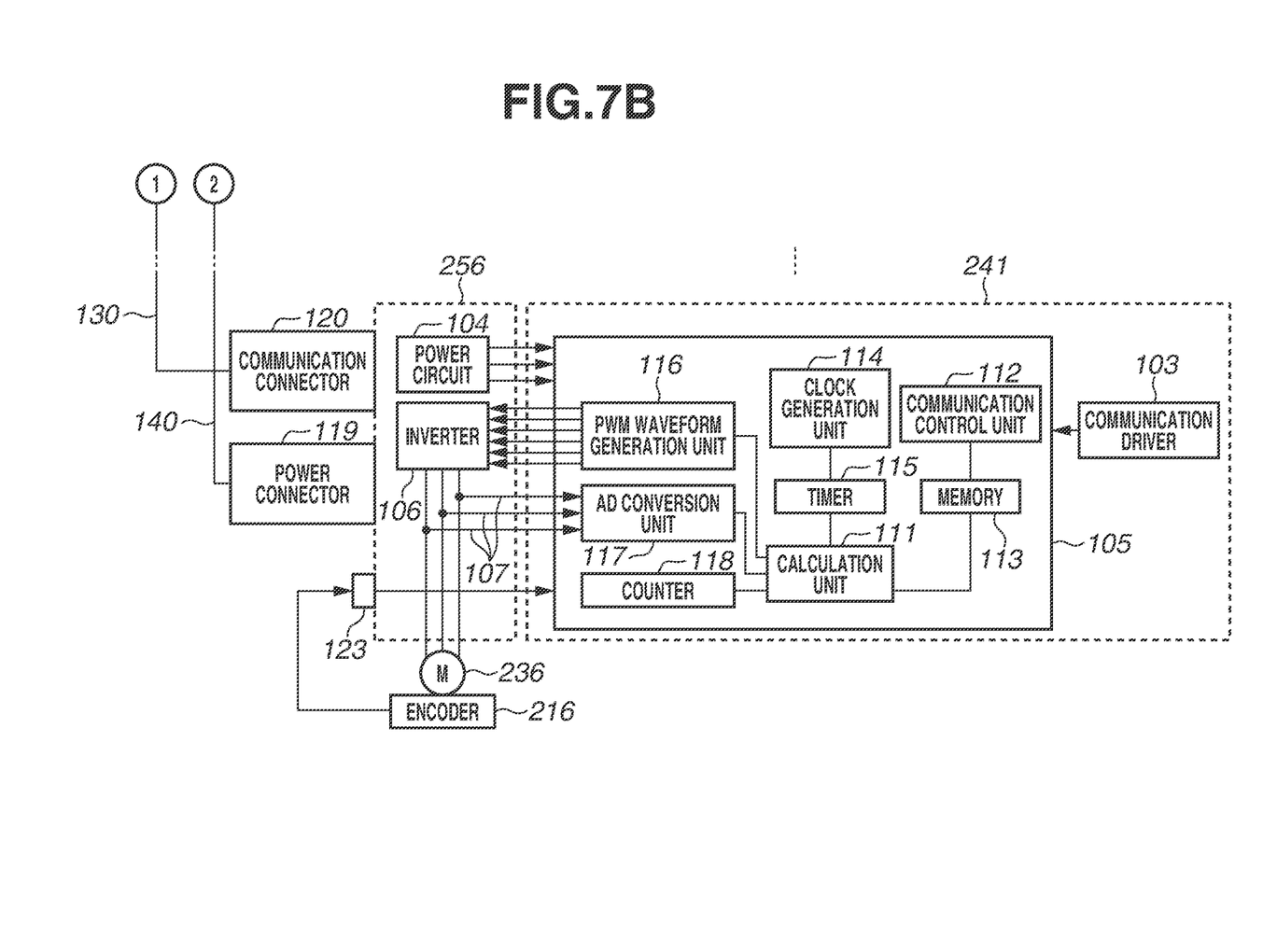

FIGS. 7A and 7B are block diagrams illustrating details of control blocks of the motor control substrates 241 and the motor drive substrates 251 to 256 according to the present exemplary embodiment. In the present exemplary embodiment, the robot controller (high-level control apparatus) 340 is electrically connected with the motor drive substrates 251 to 256 via the serial communication cable(s) 130. The power source apparatus 350 is connected with the motor drive substrates 251 to 256 to supply power thereto via the power cable(s) 140. Further, the encoders 211 to 216 are electrically connected to the motor drive substrates 251 to 256 to communicate with the control circuits 105 of the motor control substrates 241 and the position detection connectors 123, respectively.

According to the present exemplary embodiment, the power cables 140, the serial communication cables 130, the position detection connectors 123 for the encoders 211 to 216 are mounted on the motor drive substrates 251 to 256, respectively. In this way, since the substrate design and the component mounting with an optimum arrangement for each joint is possible, the wiring in the body frame of the robot arm main body 200 can be designed suitably. Further, the power cables 140 connecting the respective motor control substrates 241 and the motor drive substrates 251 to 256, the serial communication cables 130, and the interfaces of the encoders 211 to 216 can be collected at a position, and thus the downsizing of the motor control substrates 241 can be expected. In a certain robot, the present exemplary embodiment and a modification example, and the above-described exemplary embodiments and a modification example may be combined.

Now, a third exemplary embodiment will be described. Portions of a hardware configuration and a system configuration different from those in the first exemplary embodiment and the second exemplary embodiment will be illustrated and described. Portions similar to those in the first exemplary embodiment and the second exemplary embodiment have similar configurations and functions to those described above, and detailed descriptions thereof are omitted.

Figure 8:
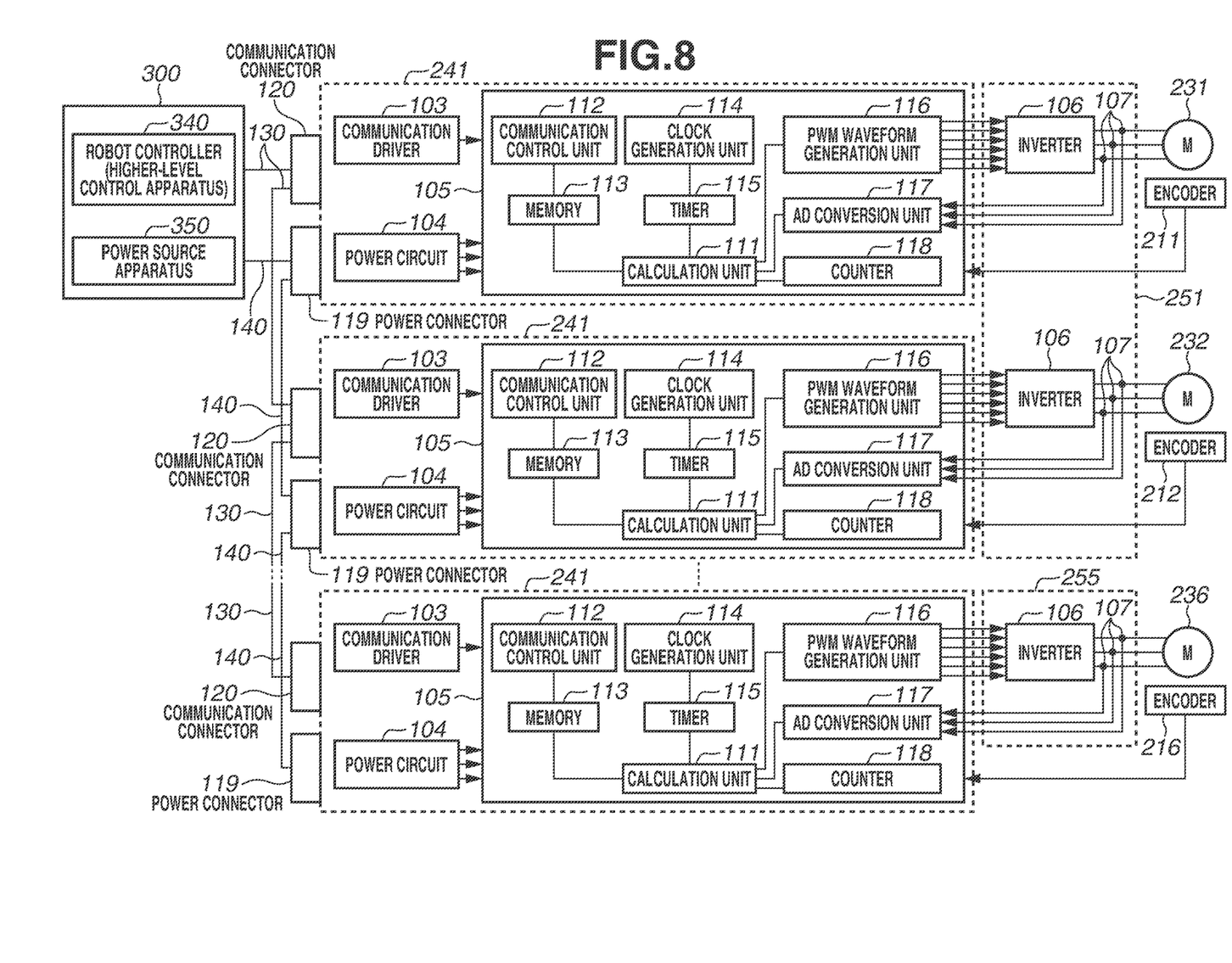
FIG. 8 is a block diagram illustrating substrate configurations of motor control substrates and motor drive substrates according to a third exemplary embodiment.

FIG. 8 is a block diagram illustrating details of the control blocks of the motor control substrates 241 and the motor drive substrates 251 to 256 according to the present exemplary embodiment. In the present exemplary embodiment, the control apparatus 300 is electrically connected with the motor control substrates 241 via the power cable(s) 140 and the serial communication cable(s) 130. The present exemplary embodiment is largely different from the first exemplary embodiment and the second exemplary embodiment in that the inverters 106, the current detection units 107 for two axes are mounted on the motor drive substrate 251, and the single motor drive substrate 251 can control the drive devices 231 and 232 for different two axes.

In general, the substrate size can be larger on the base side than on the arm end side because the base stage 210 side has a larger substrate arrangement space than the arm end side, due to the design attribution of the robot arm. On the base stage 210 side, the entire robot arm main body 200 can be made further smaller by determining the ratio of the motor control substrate and the motor drive substrate to be "2:1". In the present exemplary embodiment, the drive devices 231 and 232 on the arm base stage 210 side are exemplified, but it is not limited thereto. More specifically, at any joint, the ratio of the motor control substrate and the motor drive substrate may be configured to be "2:1". In a certain robot, the present exemplary embodiment and a modification example, and the above-described exemplary embodiments and a modification example may be combined.

Specifically, the processing procedures of the above-described exemplary embodiments are executed by the CPU 301 in the control apparatus 300. Accordingly, the software program recorded in the recording medium that can implement the above-described functions can be read and executed to achieve the processing procedures. In this case, the program itself read from the recording medium implements the functions of each exemplary embodiment described above, and the program itself and the recording medium recording the program constitute the present disclosure.

In each of the exemplary embodiments, the case where the computer-readable recording medium is the ROM, the RAM, or the flush ROM, and the program is stored in the ROM, the RAM, or the flush ROM is described. However, the present disclosure is not limited to the case. The program for implementing the present disclosure may be stored in any recording medium as long as it is a computer-readable recording medium. For example, an HDD, an external storage apparatus, or a recording disc may be used as a recording medium for supplying the control program.

In each of the above-described various exemplary embodiments, the case where the robot arm main body 200 includes the multi-joint robot arm having a plurality of joints is described, but the number of the joints is not limited to the number in the exemplary embodiments. The vertical multi-axis configuration is exemplified as the robot arm form, but the configuration described above can be applied to different types of joints of a horizontal multi-joint type robot, a parallel link type robot, and an orthogonal type robot. The present disclosure may be applied to an artificial arm, an artificial leg, and a powered suit (power assist suit) provided with sensors, such as torque sensors, for detecting forces.

The above-described various exemplary embodiments can be applied to machines that can automatically perform operations of expansion and contraction, bending and stretching, vertical movement, horizontal movement, rotational movement, or combinations thereof, based on information stored in a storage device provided in a control apparatus.

The present disclosure is not limited to the above-described exemplary embodiments, and can be modified and changed within the technical concept according to the present disclosure. The effects described in the exemplary embodiments are merely examples of the preferred effects generated from the present disclosure, and the effects of the present disclosure are not limited to the effects described in the exemplary embodiments of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-186421, filed Nov. 16, 2021, which is hereby incorporated by reference herein in its entirety.

What is claimed is:
1. A robot comprising:
at least two joints,
wherein the at least two joints include a first joint and a second joint,
wherein the first joint is provided with a first drive source, and the second joint is provided with a second drive source,
wherein a size of a first drive substrate for driving the first drive source and a size of a second drive substrate for driving the second drive source are different from each other, and wherein a first control substrate for controlling the first drive source and a second control substrate for controlling the second drive source have the same specification.

2. The robot according to claim 1, wherein the first drive substrate for driving the first drive source and the second drive substrate for driving the second drive source are differentiated in size depending on an electrical output to the first drive source and an electrical output to the second drive source.

3. The robot according to claim 1, wherein, in a case where an electrical output to the first drive source is larger than an electrical output to the second drive source, the first drive substrate for driving the first drive source is larger than the second drive substrate for driving the second drive source.

4. The robot according to claim 1, wherein, in a case where an electrical output to the first drive source is largest and an electrical output to the second drive source is smallest, the first drive substrate for driving the first drive source is largest and the second drive substrate for driving the second drive source is smallest.

5. The robot according to claim 1, wherein the first control substrate is able to be used as the second control substrate, and the second control substrate is able to be used as the first control substrate.

6. The robot according to claim 1, wherein each of the first drive substrate, the second drive substrate, the first control substrate, and the second control substrate is provided with a fourth connector connected to a detection unit configured to detect a state of a corresponding joint.

7. The robot according to claim 1, wherein, in a case where the first joint is a joint to move in a vertical direction with respect to a surface on which the robot is installed and the second joint is a joint to move in a horizontal direction with respect to the surface on which the robot is installed, the first drive substrate for driving the first drive source is larger than the second drive substrate for driving the second drive source.

8. The robot according to claim 1, wherein the robot is a vertical multi-joint robot or a horizontal multi-joint robot.

9. The robot according to claim 1, wherein the size by which the first drive substrate for driving the first drive source and the second drive substrate for driving the second drive source are differentiated is based on at least one of an area, a volume, a weight, and a mass of each of the first drive substrate and the second drive substrate.

10. An article manufacturing method for manufacturing an article, the article manufacturing method comprising:
using the robot according to claim 1 to manufacture the article.

11. The robot according to claim 1,
wherein the at least two joints include a third joint, and the third joint is provided with a third drive source, and
wherein, in a case where an electrical output to the third drive source is smaller than an electrical output to the first drive source and larger than an electrical output to the second drive source, the motor drive substrate for driving the third drive source is smaller than the motor drive substrate for driving the first drive source and larger than the motor drive substrate for driving the second drive source.

12. The robot according to claim 11,
wherein the at least two joints include the first joint, the second joint, the third joint, and a plurality of other joints other than the first joint, the second joint, and the third joint, wherein the plurality of other joints is respectively provided with drive sources, and
wherein the drive sources of the plurality of other joints are to be driven a third drive substrate for driving the third drive source.

13. The robot according to claim 1, wherein the first drive substrate and the first control substrate are arranged vertically to make up a pair, and the second drive substrate and the second control substrate are arranged vertically to make up a pair.

14. The robot according to claim 13, wherein, the first drive substrate is arranged on a lower side and the first control substrate is arranged on an upper side, and the second drive substrate is arranged on a lower side and the second control substrate is arranged on an upper side.

15. The robot according to claim 1, wherein the first drive substrate and the first control substrate are arranged vertically by metal supporting posts, and the second drive substrate and the second control substrate are arranged vertically by metal supporting posts.

16. The robot according to claim 15, wherein the metal supporting posts are arranged at four corners of the first drive substrate and the first control substrate and at four corners of the second drive substrate and the second control substrate.

17. The robot according to claim 1, wherein each of the first drive substrate and the second drive substrate is provided with a power circuit and an inverter.

18. The robot according to claim 17, wherein the first control substrate is arranged in such a way as to cover the power circuit and the inverter of the first drive substrate, and the second control substrate is arranged in such a way as to cover the power circuit and the inverter of the second drive substrate.

19. The robot according to claim 1, wherein each of the first drive substrate and the second drive substrate is provided with a first connector for communication, a second connector to be connected to a power source, and a third connector to supply power to a target.

20. The robot according to claim 19, wherein the first control substrate is provided in such a way as not to cover the first connector, the second connector, and the third connector of the first drive substrate, and the second control substrate is provided in such a way as not to cover the first connector, the second connector, and the third connector of the second drive substrate.

21. The robot according to claim 1,
wherein the at least two joints include a third joint, and the third joint is provided with a third drive source, and
wherein an electrical output to the third drive source is smaller than an electrical output to the first drive source and larger than an electrical output to the second drive source, and the motor drive substrate for driving the first drive source also is for driving the third drive source.

22. The robot according to claim 21,
wherein the at least two joints include the first joint, the second joint, the third joint, and a plurality of other joints other than the first joint, the second joint, and the third joint,
wherein the plurality of other joints is respectively provided with drive sources, and
wherein the first drive substrate for driving the first drive source, the second drive substrate for driving the second drive source, a third drive substrate for driving the third drive source, and drive substrates for respectively driving the drive sources provided to the plurality of other joints are differentiated in size.

23. The robot according to claim 22, further comprising:
a base stage that is a base portion of the robot; and
a predetermined portion that is a leading end of the robot,
wherein the first drive substrate for driving the first drive source is provided on the base stage, and the second drive substrate for driving the second drive source is provided on the predetermined portion.

24. The robot according to claim 23, wherein the second drive substrate for driving the second drive source is smaller than the first drive substrate for driving the first drive source.

25. The robot according to claim 23, wherein the second drive substrate for driving the second drive source is smaller than other motor drive substrates for driving other drive sources.

26. The robot according to claim 23, wherein when the first drive substrate, the second drive substrate, and the third drive substrate are arranged in this order from the base stage toward the predetermined portion, the third drive substrate is the smallest one, the second drive substrate is the second smallest one, and the first drive substrate is the least smallest one.

27. A method to control a robot having at least two joints,
wherein the at least two joints include a first joint and a second joint,
wherein the first joint is provided with a first drive source, and the second joint is provided with a second drive source,
wherein a size of a first drive substrate for driving the first drive source and a size of a second drive substrate for driving the second drive source are different from each other, and
wherein a first control substrate for controlling the first drive source and a second control substrate for controlling the second drive source have the same specification,
the method comprising:
wherein driving of the first drive source is controlled by the first drive substrate and the first control substrate, and driving of the second drive source is controlled by the second drive substrate and the second control substrate; and
controlling the robot.

28. A non-transitory computer-readable storage medium storing a program to cause a computer to perform a method to control a robot having at least two joints,
wherein the at least two joints include a first joint and a second joint,
wherein the first joint is provided with a first drive source, and the second joint is provided with a second drive source,
wherein a size of a first drive substrate for driving the first drive source and a size of a second drive substrate for driving the second drive source are different from each other, and
wherein a first control substrate for controlling the first drive source and a second control substrate for controlling the second drive source have the same specification,
the method comprising:
wherein driving of the first drive source is controlled by the first drive substrate and the first control substrate, and driving of the second drive source is controlled by the second drive substrate and the second control substrate; and
controlling the robot.

* * * * *